(12) United States Patent
Shi

(10) Patent No.: US 12,084,378 B2
(45) Date of Patent: Sep. 10, 2024

(54) FEEDER TANK FOR A GLASS MELTER

(71) Applicant: Owens-Brockway Glass Container Inc., Perrysburg, OH (US)

(72) Inventor: Liming Shi, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 297 days.

(21) Appl. No.: 17/232,216

(22) Filed: Apr. 16, 2021

(65) Prior Publication Data

US 2022/0332622 A1 Oct. 20, 2022

(51) Int. Cl.
*C03B 5/16* (2006.01)
*C03B 5/033* (2006.01)

(52) U.S. Cl.
CPC .............. *C03B 5/0332* (2013.01); *C03B 5/16* (2013.01); *C03B 2211/23* (2013.01)

(58) Field of Classification Search
CPC .......... C03B 5/2356; C03B 3/00; C03B 5/173
See application file for complete search history.

(56) References Cited

U.S. PATENT DOCUMENTS

| | | | |
|---|---|---|---|
| 1,953,023 A | | 3/1934 | Mulholland |
| 2,465,283 A | * | 3/1949 | Schlehr ................. C03B 37/091 65/540 |
| 3,260,587 A | * | 7/1966 | Marceau ................... C03B 5/20 65/346 |
| 4,877,449 A | * | 10/1989 | Khinkis .................... F27B 1/02 75/573 |
| 2002/0162358 A1 | * | 11/2002 | Jeanvoine ............. C03B 5/2257 65/135.1 |
| 2003/0029197 A1 | * | 2/2003 | Jeanvoine ............. C03B 5/2353 65/157 |
| 2004/0168475 A1 | * | 9/2004 | Jeanvoine ............. C03B 5/2356 65/178 |
| 2007/0122332 A1 | * | 5/2007 | Jacques ..................... C03C 1/02 423/334 |
| 2008/0145804 A1 | * | 6/2008 | Palmieri ................. C03B 5/193 431/174 |
| 2015/0013386 A1 | * | 1/2015 | Villeroy De Galhau .................... C03B 5/2353 65/335 |
| 2015/0307382 A1 | * | 10/2015 | Wang ...................... C03B 3/026 65/335 |
| 2018/0002213 A1 | * | 1/2018 | Demott ..................... F27D 3/04 |
| 2019/0161377 A1 | * | 5/2019 | Cowles ..................... C03B 5/44 |
| 2019/0284079 A1 | * | 9/2019 | Wang ...................... C03C 1/004 |
| 2021/0395127 A1 | * | 12/2021 | Ellison ................. C03B 5/2356 |
| 2023/0059556 A1 | * | 2/2023 | Guillet ...................... F27D 9/00 |

* cited by examiner

*Primary Examiner* — Erin Snelting

(57) ABSTRACT

A glass melting furnace and method for introducing batch feed material into a glass melter tank of the glass melting furnace are disclosed. The glass melting furnace comprises the glass melter tank, a feeder tank, and at least one conduit. The glass melter tank defines at least one melter tank inlet, a molten glass outlet, and an exhaust gas outlet, and the feeder tank, which is separate from the glass melter tank, defines a batch feed inlet and a feeder tank outlet. The at least one conduit is in fluid communication with the feeder tank outlet and the melter tank inlet. Moreover, the melter tank inlet is defined below a melt level of a glass melt contained within the glass melter tank and at least partially filling the at least one conduit.

21 Claims, 5 Drawing Sheets

FEEDER TANK FOR A GLASS MELTER

This disclosure relates to innovations in glass manufacturing systems and methods that involve submerged combustion melting of a batch feed material.

BACKGROUND

A glass factory includes a furnace that melts a batch feed material into molten glass. The furnace may include a glass melter tank such as, for example, a submerged combustion melter ("SCM"). A SCM includes submerged burners mounted in the floor or sidewall of the SCM that fire a mixture of a fuel and an oxidant directly into and under the surface of the glass melt contained within the SCM. The fuel and oxidant mixture discharged from the burners produces, upon ignition, powerful combustion gases that cause violent sloshing and turbulence in the glass melt. The combustion gases introduce shearing forces that facilitate rapid heat transfer and particle dissolution within the glass melt, thus improving melting and reaction kinetics, before escaping the glass melt and exiting the SCM through an exhaust gas outlet.

As the combustion gases are expelled out of the glass melt in the SCM, fine particles from the batch feed material can be swept up by the combustion gases and carried out of the SCM, particularly when the batch feed material is fed onto the glass melt from above the melt. This loss of particulate batch feed material through the exhaust outlet is known as "carry over." To collect carry over, a particulate collection device, such as a baghouse, may have to be installed within the glass factory, which adds cost and complexity to the glass-making process. Additionally, if carry over persists, the composition of the glass melt may be altered unintentionally.

To minimize carry over, the batch feed material may be piped directly into the SCM below the surface of the glass melt. However, introducing the batch feed material into the bulk of the glass melt can be challenging. For example, molten glass may leak back through the opening in the SCM through which the batch feed material is designed to be fed and/or batch feed material intended to be fed into the glass melt may be softened prematurely and, as a result, become difficult to move into the SCM.

BRIEF SUMMARY OF THE DISCLOSURE

The present disclosure embodies a number of aspects that can be implemented separately from or in combination with each other.

A glass melting furnace in accordance with one aspect of the disclosure comprises a glass melter tank that defines at least one melter tank inlet, a molten glass outlet, and an exhaust gas outlet. The glass melter tank contains a first portion of a glass melt having a melt level rising above the melter tank inlet. The glass melting furnace also includes a feeder tank that defines a batch feed inlet and a feeder tank outlet. Additionally, the glass melting furnace includes at least one conduit in fluid communication with the feeder tank outlet of the feeder tank and the melter tank inlet of the glass melter tank. A second portion of the glass melt at least partially fills the conduit.

A method for introducing batch feed material into a glass melting furnace in accordance with one aspect of the disclosure comprises several steps. One step involves introducing batch feed material into a feeder tank that is separate from a glass melter tank but fluidly connected to the glass melter tank by at least one conduit. Another step of the method involves directing the batch feed material from a feeder outlet of the feeder tank, through the conduit, and into the glass melter tank below a melt level of a glass melt contained in the glass melter tank and at least partially filling the at least one conduit. Yet another step of the method involves melting the batch feed material in the glass melter tank.

DETAILED DESCRIPTION

A glass melting furnace includes a feeder tank to feed batch feed material into a glass melter tank. The glass melter is preferably a submerged combustion melter. The feeder tank and the glass melter tank are fluidly connected by at least one conduit. An outlet of the feeder tank, an inlet of the glass melter tank that fluidly communicates with the feeder tank outlet, and a conduit that connects the feeder tank outlet and the melter tank inlet may be disposed beneath a melt level of a glass melt that partially fills the glass melter tank and additionally fills at least a portion of the conduit. Batch feed material is introduced into the feeder tank and mixed with the glass melt. The batch feed material then flows within the glass melt and through the at least one conduit into the glass melter tank. In this way, the combustion gases that are forced through the portion of the glass melt contained in the glass melter tank are isolated from the batch feed material being introduced into the feeder tank, thus minimizing or altogether preventing carry over since the combustion gases do not, upon being exhausted from the glass melt, make direct contact with the batch feed material being introduced into the feeder tank. And since less carry over is to be expected, the footprint, size, and cost of a downstream baghouse can be reduced significantly, material handling and energy costs can be reduced, and conventional batch feeding equipment can be used to deliver the batch feed material into the feeder tank.

Figure 1:
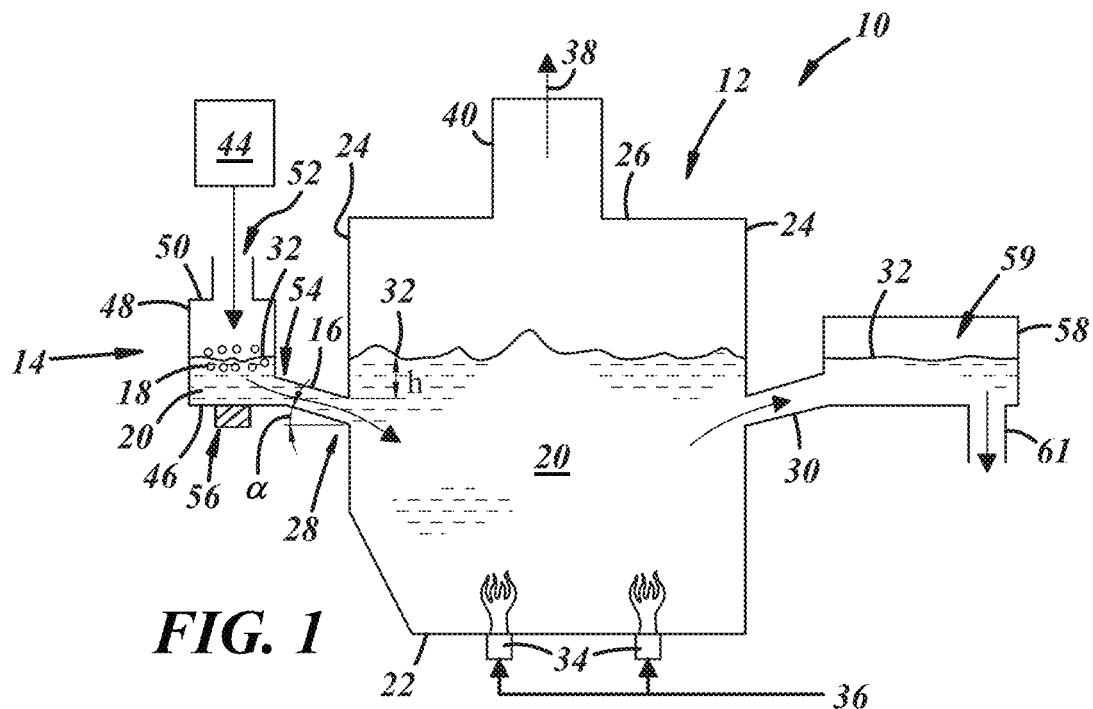
FIG. 1 is a schematic cross-sectional view of a glass melting furnace having (i) a feeder tank that introduces batch feed material into a glass melter tank and (ii) a stilling tank that receives molten glass from the glass melter tank, where the feeder tank and the glass melter tank are in fluid communication in accordance with an illustrative embodiment of the present disclosure.

Referring to FIG. 1, a glass melting furnace 10 is shown in accordance with an illustrative embodiment of the present disclosure. The glass melting furnace 10 comprises a glass melter tank 12, a feeder tank 14, and at least one conduit 16. The glass melting furnace 10 may be configured to provide molten glass to downstream forming equipment for forming glass containers or other glass articles. The glass melter tank 12 may include a refractory-built tank or other container configured to melt batch feed material 18 into molten glass. The batch feed material 18 may include one or more of (i) raw materials such as quartz sand, soda ash, limestone, etc., (ii) cullet (i.e., recycled or previously-formed glass), (iii) glass precursors such as oxides and gels, or combinations thereof. Melting of the batch feed material 18 forms a glass melt 20 having a glass chemical composition that is dictated by the formulation of the batch feed material 18. In one particular embodiment, the glass melt 20 is comprised of soda-lime-silica glass, which has a glass chemical composition that comprises 65-80 wt % $SiO_2$, 8-18 $Na_2O$, 5-15 CaO, and 0-3 $Al_2O_3$.

The glass melter tank 12 includes a melter bottom wall 22, a melter sidewall 24 coupled to and extending upwardly from the melter bottom wall 22, and a melter top wall 26 coupled to the melter sidewall 24 opposite the melter bottom wall 22. The melter bottom wall 22, the melter sidewall 24, and the melter top wall 26 define a melter chamber that contains a portion of the glass melt 20, which may be referred herein to as a "first portion" of the glass melt 20. Each of the walls 22, 24, 26 may be constructed from a refractory material and/or one or more fluid cooled panels that support an interiorly-disposed refractory material having an in-situ formed frozen glass layer (not shown) in contact with the glass melt 20. The glass melter tank 12 defines at least one melter tank inlet 28 and a molten glass outlet 30. The melter tank inlet 28 may be disposed below a melt level 32 of the first portion of the glass melt 20 in the glass melter tank 12. The molten glass outlet 30, which is also disposed below the melt level 32, may be positioned in horizontal alignment with, or it may be positioned either above or below the melter glass inlet 28 in a vertical height dimension that runs parallel to gravity. For purposes of this disclosure, the "melt level" 32 of the glass melt 20 is the nominal height of the first portion of the glass melt 20, which can be defined by a horizontal plane that along a surface of the portion of the glass melt 20 contained in the feeder tank 14 or, if the glass melt 20 does not at least partially fill the feeder tank 14, a surface of the portion of the glass melt 20 contained in the at least one conduit 16, through the glass melter tank 12. The portion of the glass melt 20 that is contained outside of the melter chamber of the glass melter tank 12 and at least partially fills the conduit 16 may be referred to herein as a "second portion" of the glass melt 20.

The glass melter tank 12 may be a submerged combustion melter that includes submerged burners 34 mounted in the melter bottom wall 22 or the melter sidewall 24. The submerged burners 34 are thus immersed by the portion of the glass melt 20 within the glass melter tank 12. The submerged burners 34 promote rapid mass and heat transfer by discharging a combustible gas mixture 36 of a fuel (e.g., methane or propane) and an oxidant (e.g., oxygen, air, or an oxygen-enriched gas that contains at least 80 vol % $O_2$) directly into and under the surface of the glass melt 20, which enhances mixing and melting of the batch feed material 18 compared to conventional melting processes that utilize radiant heating from overhead burners, but also agitates the portion of the glass melt 20 within the glass melter tank 12. In that regard, the first portion of the glass melt 20 that is contained within the glass melter tank 12 is under a state of agitation and is experiencing turbulent flow patterns. The autoignition and combustion of the combustible gas mixture 36 within the glass melt 20 produces exhaust gases 38 that exit the glass melter tank 12 through an exhaust gas outlet 40. The exhaust gas outlet 40 may be, and often is, defined in the melter top wall 26 of the glass melter tank 12.

Referring again to FIG. 1, the feeder tank 14 is fluidly coupled to, but separate from, the glass melter tank 12. The feeder tank 14 is configured to receive the batch feed material 18 and includes a feeder bottom wall 46, a feeder top wall 50, and a feeder sidewall 48 extending upwardly from the feeder bottom wall 46 to the feeder top wall 50. The feeder bottom wall 46, the feeder sidewall 48, and the feeder top wall 50 define a tank chamber that is physically separated from the melter chamber of the glass melter tank 12. The feeder tank 14 additionally defines a batch feed inlet 52 and a feeder tank outlet 54. The feeder tank 14 receives the batch feed material 18 through the batch feed inlet 52 and, in this particular embodiment, contains a second portion of the glass melt 20 that fills the conduit 16 and extends into the tank chamber. The second portion of the glass melt 20 contained in the conduit 16 and the feeder tank 14 is not in a state of agitation and is not experiencing turbulent flow patterns, and, consequently, a surface of the portion of the glass melt 20 that partially fills the feeder tank is calmer than the surface of portion of the glass melt 20 contained in the glass melter tank 12. The batch feed material 18 is fed through the batch feed inlet 52 into the second portion of the glass melt 20 using, for example, a batch charger 44.

In some instances, and as shown in FIG. 1, the feeder tank 14 may be in thermal communication with a heat source 56. The heat source 56 is configured to supply heat to the second portion of the glass melt 20 that extends into the feeder tank 14 in order to maintain that portion of the glass melt 20 at or above a certain temperature, such as 1100° C., to ensure sufficient fluidity of the glass so that the batch feed material 18 can be continuously carried through the conduit 16 and into the glass melter tank 12 by the glass melt 20. The heat source 56 can supply heat to the glass melt 20 in various ways including, for example, by preheating the batch feed material 18, radiantly heating the second portion of the glass melt 20, and/or by heating at least one of the feeder bottom wall 46 or the feeder sidewall 48. Among other options, the heat source 56 may include an electric-based heater (e.g., a resistive heater), a fuel-based heater (e.g., a flame), or a radiative-based heater, and it may be disposed in any of a variety of locations. For example, in a preferred embodiment, the heat source 56 is disposed in direct or indirect contact with the feeder bottom wall 46, as shown in FIG. 1, or in direct or indirect contact with the feeder sidewall 48, the feeder top wall 50, or any combination thereof. To help operate the heat source 56, the temperature of the second portion of the glass melt 20 proximate the feeder bottom wall 46 and/or in the conduit 16 may be measured and, based on the measured temperature, the heat source 56 may be controlled with conventional control equipment. In some implementations, the feeder tank 14 does not include burners, but may include other forms of the heat source 56.

As depicted in FIG. 1, the at least one conduit 16 is in fluid communication with the feeder tank outlet 54 of the feeder tank 14 and with the melter tank inlet 28 of the glass melter tank 12, thereby defining a passageway therebetween. Here, the feeder tank outlet 54 and the melter tank inlet 28 are defined below the melt level 32 of the glass melt 20. The melt level 32 of the glass melt 20 in the glass melter tank 12 may rise to at least a minimum height h of 1 inch above the melter tank inlet 28. The at least one conduit 16 may be a tube that defines a contained channel through which the glass melt 20 can flow by gravity, and/or by pull from molten glass exiting the molten glass outlet 30, while carrying batch feed material 18 from the second portion of the glass melt 20 into the first portion of the glass melt 20 inside the glass melter tank 12. The at least one conduit 16 may be sloped downwardly at an angle α relative to the horizontal to assist with the flow of molten glass from the feeder tank 14 into the glass melter tank 12. The angle α may range from 10° to 80°. In the embodiment shown in FIG. 1, the feeder bottom wall 46 may be oriented horizontally (i.e., perpendicular to gravity), as shown, but it does not necessarily have to be oriented in that way.

During operation of the glass melter tank 12, the tendency for carry over occur and persist is significantly reduced. Referring still to FIG. 1, as batch feed material 18 is introduced or fed into the feeder tank 14 onto the second portion of the glass melt 20 within the feeder tank 14, the batch feed material 18 mixes with the glass melt 20 in the feeder tank 14 and is carried through the conduit 16 into the glass melter tank 12. Because the conduit 16, the melter tank inlet 28, and the feeder tank outlet 54 are positioned below the melt level 32 of the glass melt 20, the exhaust gases 38 that emerge from the first portion of the glass melt 20 within the glass melter tank 12 cannot flow into the feeder tank 14 and cannot interact with the batch feed material outside of the glass melt 20. This isolation of the exhaust gases 38 prevents direct contact between the exhaust gases 38 and the particulates from the glass batch material 18, thus inhibiting carry over.

In addition to the glass melter tank 12, the feeder tank 14, and the at least one conduit 16, the glass melting furnace 10 may further include a stilling tank 58. The stilling tank 58 is fluidly coupled to and configured to receive molten glass from the molten glass outlet 30 of the glass melter tank 12. The stilling tank 58 defines a stilling chamber 59 and a feeding spout 61. The molten glass received from the glass melter tank 12, which may be "foamy" in that it typically includes anywhere from 20 vol % to 60 vol % of entrained gas bubbles, flows into the stilling chamber 59 and feeds an intermediate pool of molten glass. A surface of the pool of molten glass in the stilling tank 58 is calmer than the surface of first portion of the glass melt 20 contained in the glass melter tank 12 since the intermediate pool of molten glass is not in a state of agitation and is not experiencing turbulent flow patterns. The feeding spout 61 can be appended to the stilling tank 58 and may include a reciprocal plunger (not shown) that controls the rate of flow of molten glass out of the stilling tank 58 via the feeding spout 61.

Figure 2:
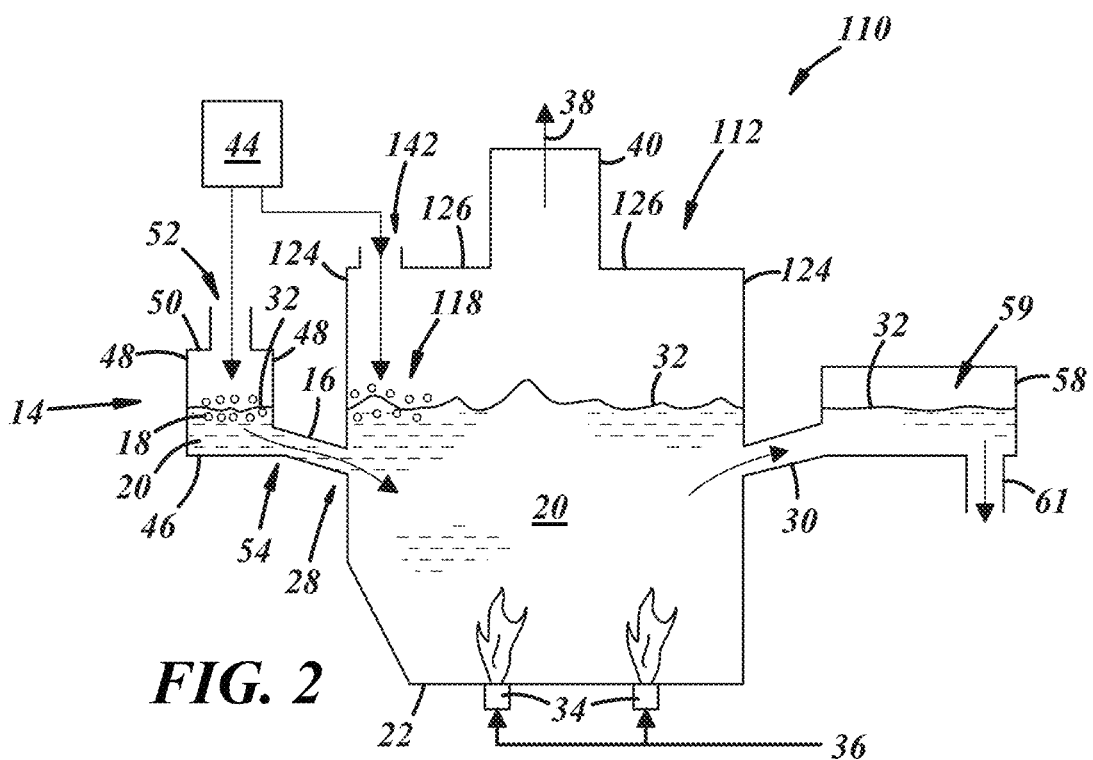
FIG. 2 is a schematic cross-sectional view of a glass melting furnace similar to the furnace shown in FIG. 1, although here, in accordance with an illustrative embodiment of the present disclosure, the glass melter tank additionally includes a separate batch inlet through which batch feed material can be directly introduced into the glass melter tank.

Referring now to FIG. 2, another embodiment of the glass melting furnace, which is designated by reference numeral 110, is shown. The glass melting furnace 110 includes a glass melter tank 112 that defines at least one batch inlet 142, which is separate from the melter tank inlet 28 described previously. The embodiment of the glass melting furnace 110 illustrated here in FIG. 2 is similar in many respects to the embodiment of the glass melting furnace 10 illustrated in FIG. 1, and like numerals among the embodiments generally designate like or corresponding elements throughout the several views of the drawing figures. Accordingly, the description of corresponding features between the embodiments that were described previously with respect to FIG. 1 are incorporated into the discussion of the glass melting furnace 110 depicted in FIG. 2, unless stated to the contrary, and for that reason the description of such common subject matter is generally not repeated.

As shown in FIG. 2, the batch feed material 18, 118 may be introduced into the batch feed inlet 52 defined in the feeder tank 14 and/or the batch inlet 142 defined in the glass melter tank 112 by a batch charger 44 or a combination of batch chargers (not shown) in which one charger feeds the batch feed inlet 52 and another charger feeds the batch inlet 142. The batch inlet 142 may be disposed in the melter top wall 126 (as shown) or the melter sidewall 124, or both walls 124, 126, so that batch feed material 118 can be introduced into the glass melter tank 112 onto the surface of the first portion of the glass melter 20 contained in the melter tank 112. By way of the batch inlet 142, the feeder tank 14 can be bypassed and batch feed material 118 can be introduced directly into the first portion of the glass melt 20 contained inside the glass melter tank 112 whenever desired. This provides flexibility in how the batch feed material 18, 118 is ultimately added to the glass melter tank 112 as the batch feed material 18 may be introduced into the first portion of the glass melt 20 indirectly through the melter tank inlet 28 via the feeder tank 14 and the conduit 16, directly through the batch inlet 142, or both. In some instances, the batch feed material 118 fed through the batch inlet 142 includes batch material particles having a particle size (i.e., the largest measured dimension of the particle) that is 25 μm or greater, or more preferably 50 μm or greater, so as to exclude the type of fine particles that can lead to carry over. In one example, only pieces of cullet that meet the aforementioned size criterion are fed through the batch inlet 142 as the batch feed material 118.

Figure 3:
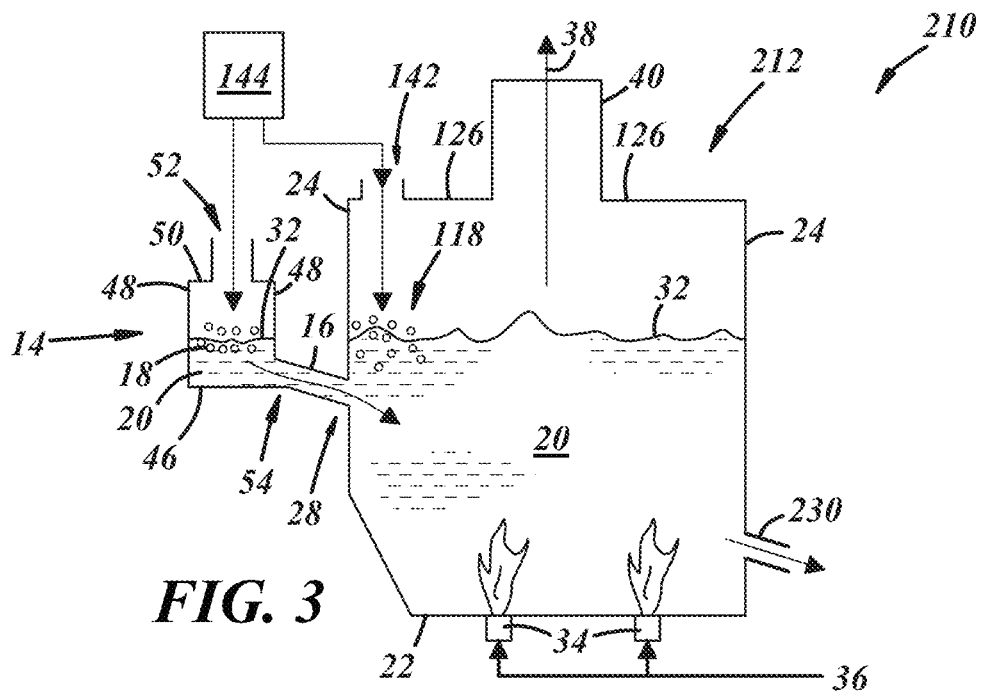
FIG. 3 is a schematic cross-sectional view of a glass melting furnace similar to the furnace shown in FIG. 2, although here, in accordance with an illustrative embodiment of the present disclosure, the furnace does not include a stilling tank.

Referring now to FIG. 3, another embodiment of the glass melting furnace, which is designated by reference numeral 210, is shown. The glass melting furnace 210 is similar to the glass melting furnace 110 shown in FIG. 2 except that it omits a stilling tank. In this embodiment of the glass melting furnace 210, molten glass from the glass melter tank 212 flows directly through the molten glass outlet 230 to downstream processing equipment such as, for example, a glass gob feeder or a container molding station.

Figure 4:
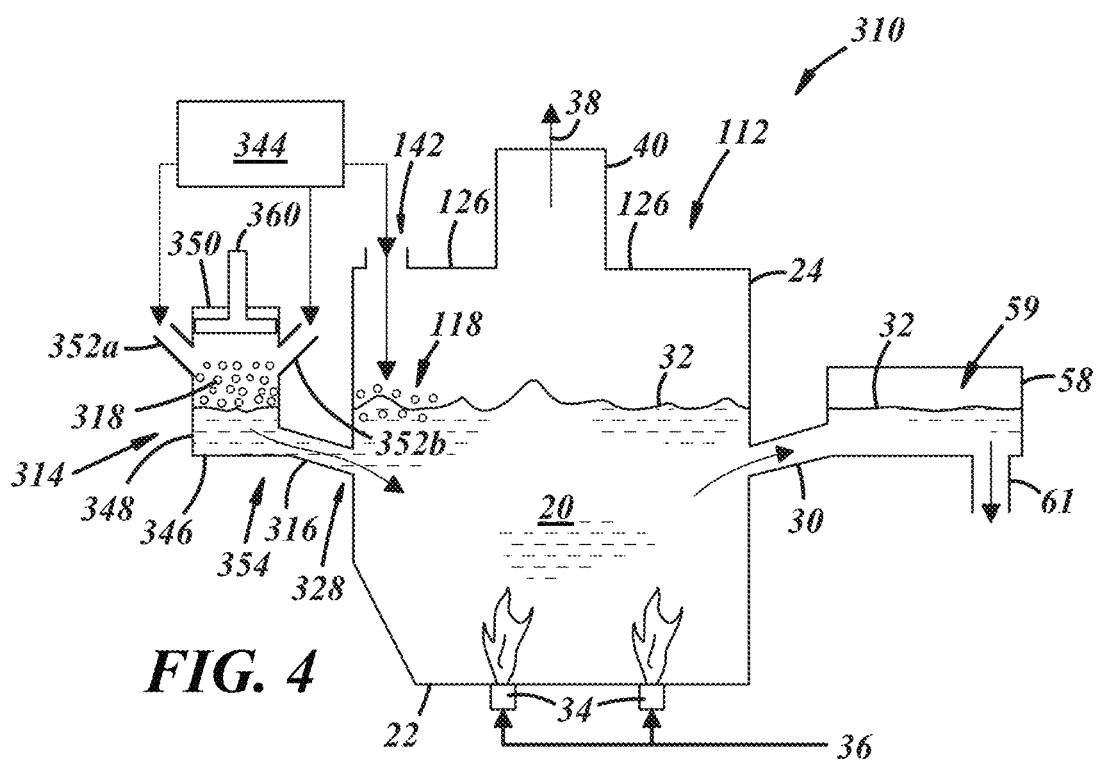
FIG. 4 is a schematic cross-sectional view of a glass melting furnace similar to the furnace shown in FIG. 2, although here, in accordance with an illustrative embodiment of the present disclosure, the feeder tank includes multiple batch feed inlets and a piston to control the addition of the batch material into the feeder tank.

Referring now to FIG. 4, another embodiment of the glass melting furnace, which is designated by reference numeral 310, is shown. The glass melting furnace 310 is similar to the glass melting furnace 110 shown in FIG. 2 except, here, the feeder tank 314 includes multiple batch feed inlets 352*a*, 352*b* and a piston 360 that is reciprocally movable within the feeder tank 314 between the feeder top wall 350 and the feeder bottom wall 346. The batch feed inlets 352*a*, 352*b* may be defined in the feeder sidewall 348, as shown, and the batch charger 344 is configured to provide the batch feed material 118, 318 to the feeder tank 314 through the batch feed inlets 352*a*, 353*b* and to the glass melter tank 112 through the at least one batch inlet 142. As another option, a combination of batch chargers (not shown) may be employed in which one charger feeds the batch feed material 318 to one of the batch feed inlets 352*a*, another batch charger feeds the batch feed material 318 to the other of the batch feed inlets 352*b*, and still another batch charger feeds the batch feed material 118 to the batch inlet 142.

The piston 360 is movable toward the feeder bottom wall 346 to urge the batch feed material 318 into the second portion of the glass melt inside the feeder tank 314. The piston 360 may be configured to contact only the batch feed material 318 and not the second portion of the glass melt 20. The piston 360 can be retracted toward the feeder top wall 350 so that the batch feed material 318 can be introduced into the feeder tank 314 below the piston 360. Once the batch feed material 318 is present in the feeder tank 314 on the second portion of the glass melt 20, the piston 360 is protracted downward away from the feeder top wall 350, past the batch feed inlets 352*a*, 352*b*, and into contact with the batch feed material 318. In this way, the piston 360 urges the batch feed material 318 into the second portion of the glass melt 20, which in turn helps push the batch feed material 318 through the conduit 316 and into first portion of the glass melt 20 through the melter tank inlet 328.

Figure 5:
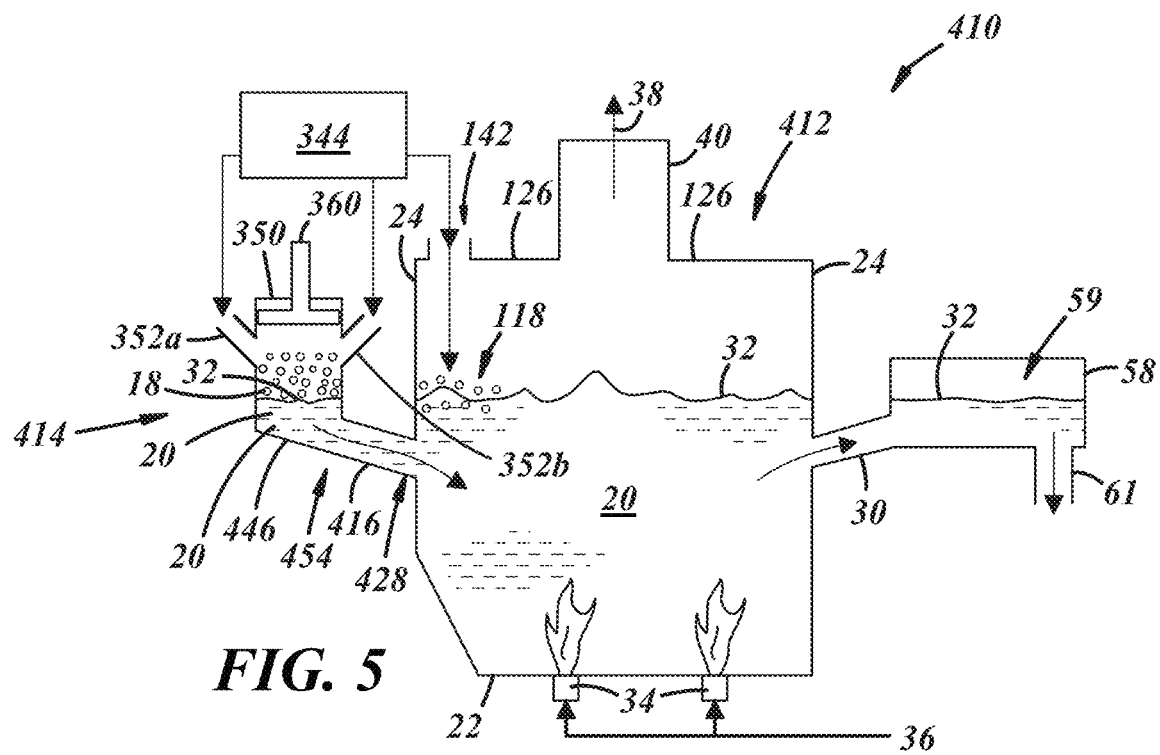
FIG. 5 is a schematic cross-sectional view of a glass melting furnace similar to the furnace shown in FIG. 4, although here, in accordance with an illustrative embodiment of the present disclosure, a bottom wall of the feeder tank is sloped downwardly.

Referring now to FIG. 5, another embodiment of the glass melting furnace, which is designated by reference numeral 410, is shown. The glass melting furnace 410 is similar to the glass melting furnace 310 shown in FIG. 4 except that the feeder bottom wall 446 of the feeder tank 414 is sloped downwardly towards the glass melter tank 412. The feeder bottom wall 446 may be sloped at the same angle as the conduit 416 to aid in the flow of the batch feed material 18 and the glass melt 20 into and through the conduit 416 and eventually into the glass melter tank 412. Of course, the feeder bottom wall 446 does not necessarily have to be sloped at the same angle as the conduit 416.

Figure 6:
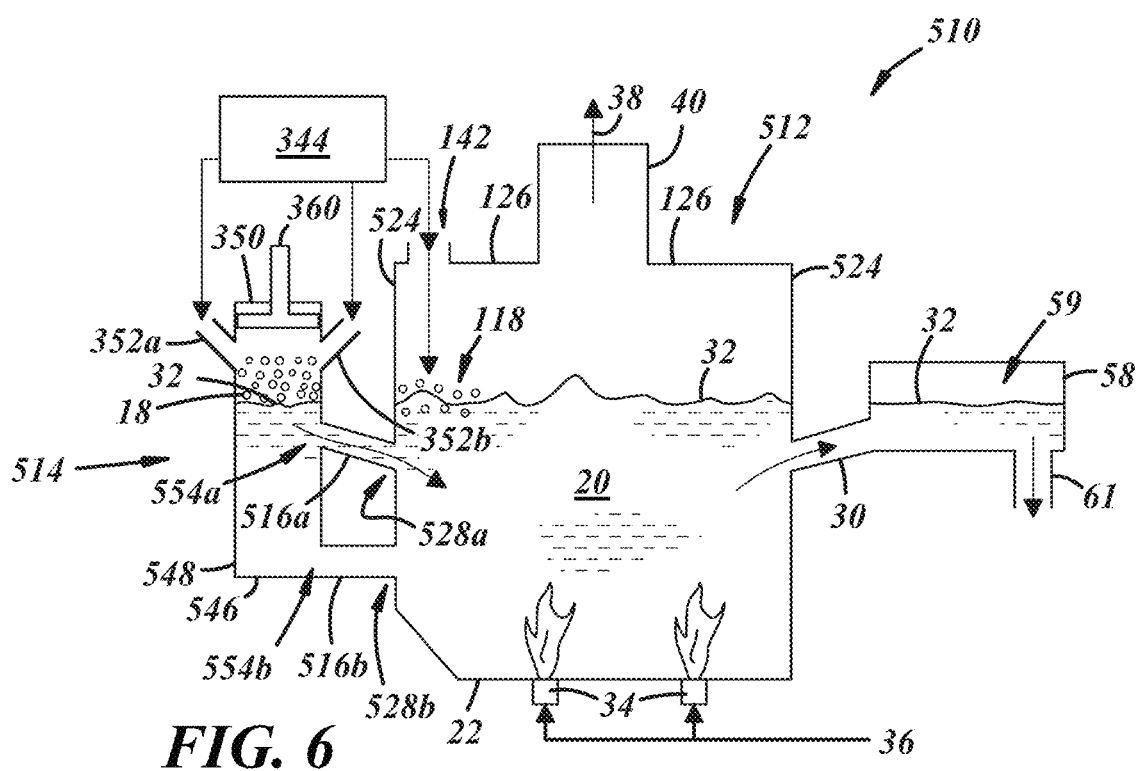
FIG. 6 is a schematic cross-sectional view of a glass melting furnace similar to the furnace shown in FIG. 4, although here, in accordance with an illustrative embodiment of the present disclosure, the feeder tank is coupled to the glass melter tank by at least two conduits, each of which extends from the feeder tank to the glass melter tank below a melt level of the glass melt.

Referring now to FIG. 6, another embodiment of the glass melting furnace, which is designated by reference numeral 510, is shown. The glass melting furnace 510 shown here is similar to the glass melting furnace 310 shown in FIG. 4 except that the feeder tank 514 is fluidly coupled to the glass melter tank 512 by at least a first conduit 516*a* and a second conduit 516*b*. Each of the first conduit 516*a* and the second conduit 516*b* may be coupled to, and extend between, the feeder sidewall 548 and the melter sidewall 524, and each of the conduits 516*a*, 516*b* is in fluid communication with a feeder tank outlet 554*a*, 554*b* and a melter tank inlet 528*a*, 528*b*, respectively, so as to define a passageway therebetween. The first conduit 516*a* and the second conduit 516*b* are spaced apart with the first conduit 516*a* being disposed more proximate the melt level 32 of the glass melt 20 and the second conduit 516*b* being disposed farther from the melt level 32 than the first conduit 516*b* and more proximate the feeder bottom wall 546 of the feeder tank 512. Additionally, the first conduit 516*a* may be sloped downwardly from the feeder tank 514 to the glass melter tank 512 to aid in the flow of batch feed material 18 through the first conduit 516*a*, and the second conduit 516*b* may be oriented horizontally between feeder tank 514 and the glass melter tank 512 in the event that an avenue for exchanging molten glass between the feeder tank 514 and the glass melter tank 512 is needed. Indeed, with this configuration, molten glass can circulate between the feeder tank 514 and the glass melter tank 512 by flowing from the glass melter tank 512 into the feeder tank 514 through the second conduit 516*b* and then flowing from the feeder tank 514 back into the glass melter tank 512 through the first conduit 516*a*.

Figure 7:
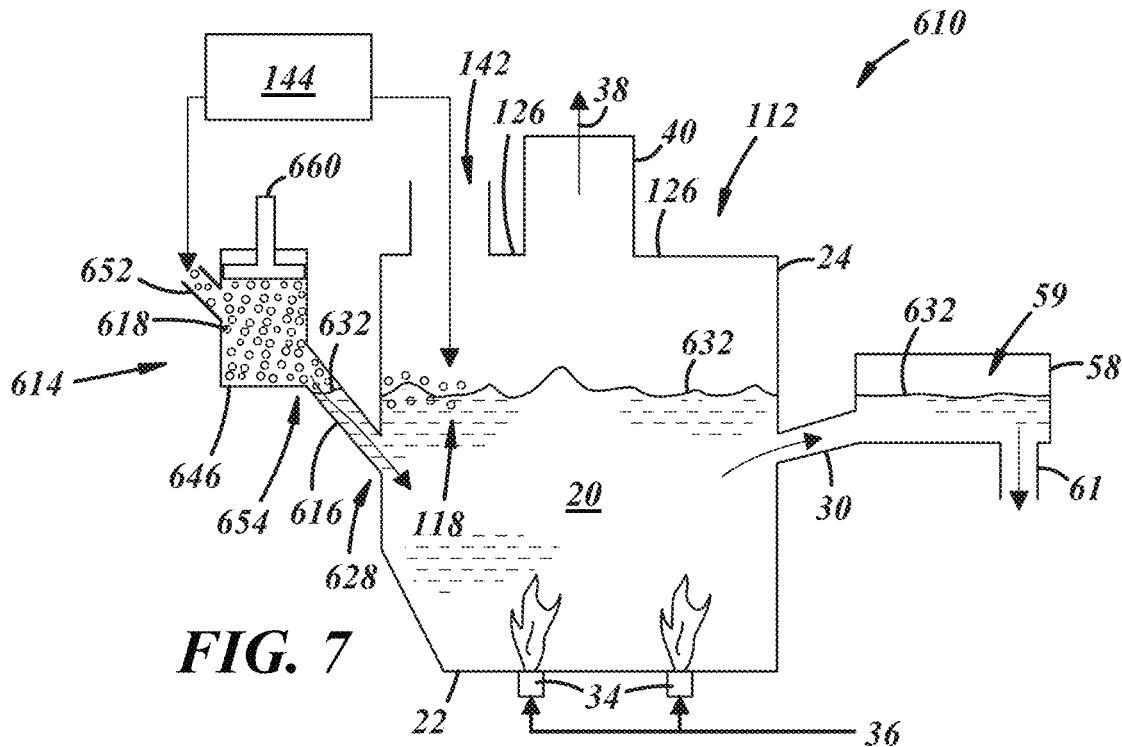
FIG. 7 is a schematic cross-sectional view of a glass melting furnace similar to the furnace shown in FIG. 2, although here, in accordance with an illustrative embodiment of the present disclosure, the feeder tank includes a piston to control the addition of the batch feed material into the feeder tank, and the glass melt does extend into the feeder tank but, rather, only partially fills the conduit.

Referring now to FIG. 7, still another embodiment of the glass melting furnace, which is designated by reference numeral 610, is shown. The glass melting furnace 610 is similar to the glass melting furnace 110 shown in FIG. 2 except that the feeder tank outlet 654 defined in the feeder tank 614 is disposed above the melt level 632 of the first portion of the glass melt 20 while the melter tank inlet 628 defined in the glass melter tank 112 is disposed below the melt level 632. As such, the second portion of the glass melt 20 does not rise into the feeder tank 614 but, rather, only partially fills the conduit 616 that fluidly couples the feeder tank 614 to the glass melter tank 112. As the batch feed material 618 is fed into the feeder tank 614 through the batch feed inlet 652, the feed material 618 falls into the conduit 616 under the force of gravity and/or is urged into the conduit by the downward motion of the piston 660. Once in the conduit 616, the batch feed material 618 mixes with the second portion of the glass melt 20 contained in the conduit 616 and is carried through conduit 616 by molten glass into the glass melter tank 112.

Figure 8:
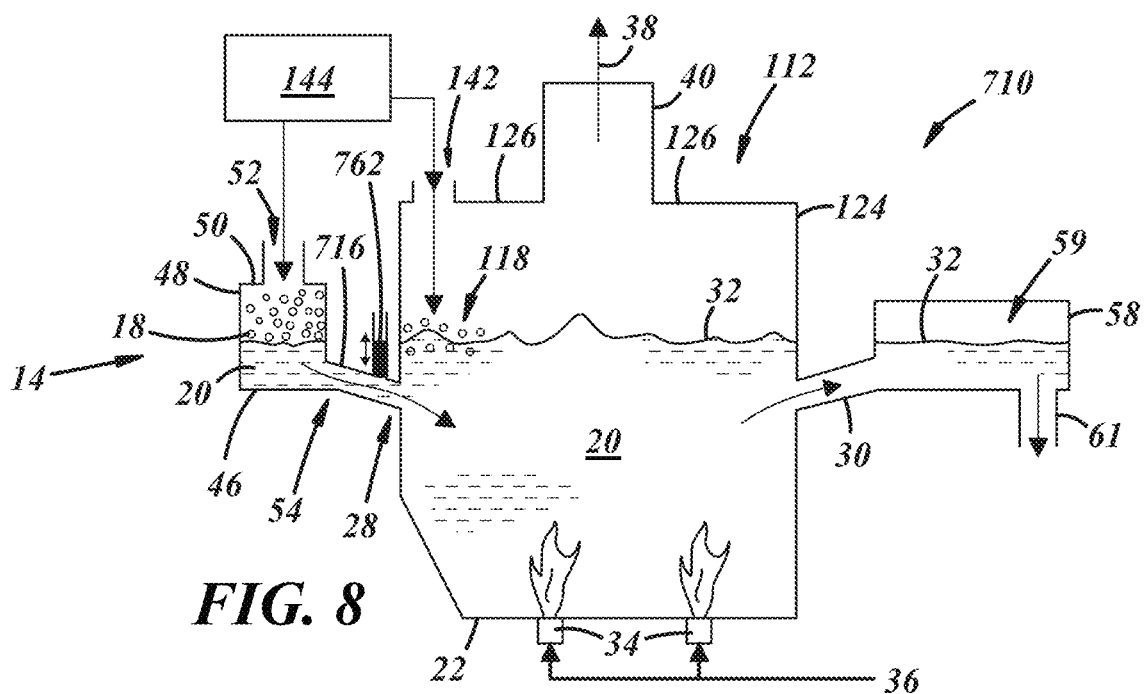
FIG. 8 is a schematic cross-sectional view of a glass melting furnace similar to the furnace shown in FIG. 2, although here, in accordance with an illustrative embodiment of the present disclosure, a gate is included in the conduit that fluidly couples the feeder tank to the glass melter tank.

Referring now to FIG. 8, yet another embodiment of the glass melting furnace, which is designated by reference numeral 710, is shown. The glass melting furnace 710 is similar to the glass melting furnace 110 of FIG. 2 except that, here, the conduit 716 includes a gate 762 or other device for at least partially closing the conduit 716 so that glass flow between the feeder tank 14 and the glass melter tank 112 can be restricted or altogether prevented. The inclusion of the gate 762 in the conduit 716 can be useful for various reasons including shutting down the glass melting furnace 710. The gate 762 may be manually adjustable or it may be controlled pneumatically or by a servo motor that is responsive to an automated control system. In FIG. 8, the gate 762 is shown as a sliding gate, although other suitable types of gates may certainly be employed.

Figure 9:
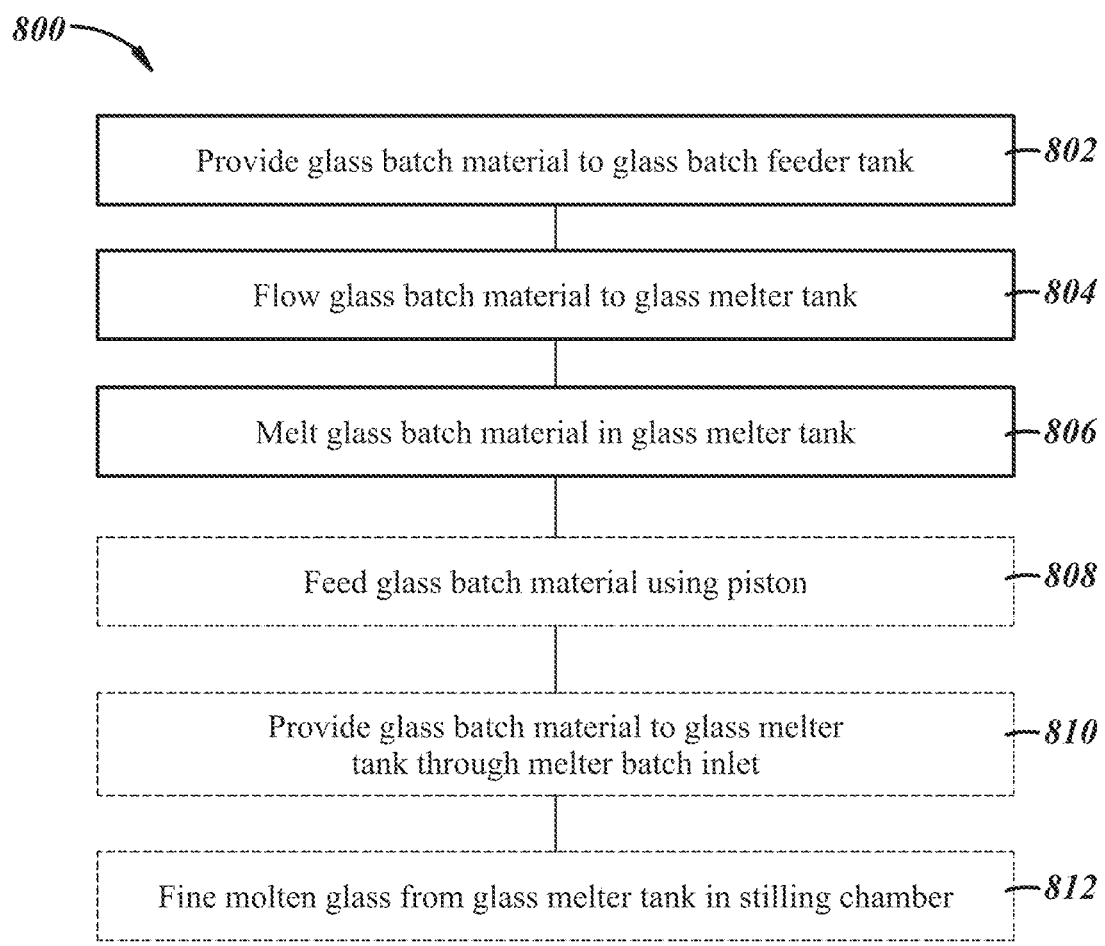
FIG. 9 is a flow diagram showing various steps of a method for introducing batch feed material into a glass melting furnace in accordance with an illustrative embodiment of the present disclosure.

FIG. 9 illustrates an example of a method 800 for feeding batch feed material into a glass melting furnace in accordance with the above disclosure. The method 800 is described in the context of the glass melting furnaces 10, 110, 210, 310, 410, 510, 610, 710 described above and, where applicable, reference will occasionally be made to specific furnace embodiments where a particular feature is present. The method 800 comprises a step 802 of providing batch feed material 18, 318, 618 into the feeder tank 14, 314, 414, 514, 614. The batch feed material 18, 318, 618 may be introduced into the feeder tank 14, 314, 414, 514, 614 though the batch feed inlet 52, 352*a*, 352*b*, 652 by the batch charger 44, 144, 344. And, upon being introduced into the feeder tank 14, 314, 414, 514, 614, the batch feed material 18, 318, 618 is mixed with the second portion of the glass melt 20 that at least partially fills the conduit 16, 316, 416, 516*a*, 516*b*, 616, 716 and may rise into the feeder tank 14, 314, 414, 514, 614.

The method 800 also comprises a step 804 of directing the batch feed material 18, 318, 618 from the feeder tank outlet 54, 354, 454, 554*a*, 554*b*, 654 of the feeder tank 14, 314, 414, 514, 614, through the conduit 16, 316, 416, 516*a*, 516*b*, 616, 716, and into the melter tank inlet 28, 328, 428, 528*a*, 528*b*, 628 of the glass melter tank 12, 112, 212, 412, 512.

Specifically, as the batch material 18, 318, 618 is introduced into the feeder tank 14, 314, 414, 514, 614 and mixes with the second portion of the glass melt 20, the material 18, 318, 618 is carried by the glass melt 20 through the conduit 16, 316, 416, 516a, 516b, 616, 716 to the glass melter tank 12, 112, 212, 412, 512. Gravity and/or a downward slope of the conduit 16, 316, 416, 516a, 516b, 616, 716 may assist in moving the batch feed material 18, 318, 618 into the glass melter tank 12, 112, 212, 412, 512 through the glass melt. Additionally, if desired, a piston 360, 660 disposed within the feeder tank 314, 414, 514, 614 may be moved downwardly to urge the batch feed material 18, 318, 618 into the second portion of the glass melt 20 and to assist in flowing the glass through the conduit 16, 316, 416, 516a, 516b, 616, 716.

The method 800 further comprises a step 806 of melting the batch feed material 18, 318, 618 in the glass melter tank 12, 112, 212, 412, 512. Such melting may include heating the batch feed material 18, 318, 618 by discharging the combustible gas mixture 36 out of the submerged burners 34 and into the first portion of the glass melt 20 contained in the glass melter tank 12, 112, 212, 412, 512. The combustion gases 38 that result from combustion of the gas mixture 36 rise forcefully through the first portion of the glass melt 20. These gases 38 introduce turbulent flow patterns within the first portion of the glass melt 20 and, thus, agitate the melt 20, which results in rapid heat transfer and melting of the batch feed material 18, 318, 618 within the melt 20. The combustion gases 38 eventually exit the glass melter tank 12, 112, 212, 412, 512 through the exhaust gas outlet 40.

As shown further in FIG. 9 by dashed-lined boxes, several other steps may also be practiced as part of the method 800. For instance, the method 800 may comprise a step 808 of contacting the batch feed material 18, 318, 618 introduced into the feeder tank 314, 414, 514, 614 onto the glass melt 20 with a piston 360, 660. The piston 360, 660, which may be reciprocally movable, is moved downwardly toward the feeder bottom wall 346, 446, 546, 646 and makes contact with the batch feed material 18, 318, 618. The piston 360, 660 urges or pushes the batch feed material 18, 318, 618 into the second portion of the glass melt 20 to help move the batch feed material 18, 318, 618 through the conduit 316, 416, 516a, 516b, 616 and into the first portion of the glass melt 20 contained in glass melter tank 112, 412, 512. While not necessarily required, the piston 360, 660 may contact and push the batch feed material 18, 318, 618 in a reciprocating downward motion and, in doing so, may make contact with the batch feed material 18, 318, 618 but not the second portion of the glass melt 20. In some operating scenarios, the piston 360, 660 may push a first amount of the batch feed material 18, 318, 618 into the second portion of the glass melt 20, retract, and then, after additional batch feed material 18, 318, 618 is introduced into the feeder tank 314, 414, 514, 614, the piston 360, 660 may push a second amount of the batch feed material 18, 318, 618 into the second portion of the glass melt 20.

Still further, the method 800 may comprise a step 810 of introducing batch feed material 118 directly into the glass melter tank 112, 212, 412, 512 through the batch inlet 142 separately from the feeder tank 14, 314, 414, 514, 614. The batch feed material 118 may be introduced into the glass melter tank 112, 212, 412, 512 through the batch inlet 142 at the same time that batch feed material 18, 318, 618 is being introduced through the batch feed inlet 52, 352a, 352b, 652 or, in other instances, batch feed material may be introduced into the glass melter tank 112, 212, 412, 512 through only one of the batch inlet 142 or the batch feed inlet 52, 352a, 352b, 652. The batch charger 44, 144, 344 (or multiple dedicated batch chargers) may introduce the batch feed material 18, 318, 618 into the feeder tank 14, 314, 414, 514, 614 through the batch feed inlet 52, 352a, 352b, 652 and may also introduce batch feed material 118 into the glass melter tank 112, 212, 412, 512 through the batch inlet 142. And, as noted above, the batch feed material 118 fed through the batch inlet 142 may be comprised of batch feed material particles that have a particle size of 25 μm or greater, or more preferably 50 μm or greater, to prevent carry over, while the batch feed material 18, 318, 618 fed through the batch feed inlet 52, 352a, 352b, 652 that communicates with the feeder tank 14, 314, 414, 514, 614 may include batch feed material particles that are any size including particles that are smaller than 25 μm.

The above disclosure has been presented in conjunction with several illustrative embodiments. Other embodiments not specifically disclosed, and modifications and variations of the disclosed embodiments, will readily suggest themselves to those of ordinary skill in the art in view of the foregoing discussion. The disclosure is intended to embrace all such modifications and variations as fall within the spirit and broad scope of the appended claims.

The invention claimed is:

1. A glass melting furnace, comprising:
    a glass melter tank that defines at least one melter tank inlet, a molten glass outlet, and an exhaust gas outlet, the glass melter tank containing a first portion of a glass melt having a melt level rising above the melter tank inlet;
    a feeder tank that defines a batch feed inlet and a feeder tank outlet located below the melt level and that contains a second portion of the glass melt; and
    at least one conduit in fluid communication with the feeder tank outlet of the feeder tank and the melter tank inlet of the glass melter tank, and wherein a second portion of the glass melt at least partially fills the at least one conduit and also partially fills the feeder tank.

2. The glass melting furnace of claim 1, wherein the glass melter tank is a submerged combustion melter that includes submerged burners immersed by the glass melt and configured to discharge a combustible gas mixture of a fuel and an oxidant directly into the glass melt.

3. The glass melting furnace of claim 1, wherein the glass melter tank defines a batch feed inlet through which batch feed material is introduced directly into the glass melter tank.

4. The glass melting furnace of claim 1, wherein the feeder tank does not include any burners.

5. The glass melting furnace of claim 1, wherein the at least one conduit includes
    a first conduit that is angled downwardly from the feeder tank outlet of the feeder tank to the melter tank inlet of the glass melter tank, and
    a second conduit that is oriented horizontally between the feeder tank and the glass melter tank.

6. The glass melting furnace of claim 1, wherein the feeder tank includes a feeder bottom wall, a feeder top wall, and a feeder sidewall extending upwardly from the feeder bottom wall to the feeder top wall, and wherein the feeder bottom wall is oriented horizontally and the at least one conduit is angled downwardly from the feeder bottom wall.

7. The glass melting furnace of claim 1, further comprising a gate to at least partially close the at least one conduit.

8. A glass melting furnace, comprising:
    a glass melter tank that defines at least one melter tank inlet, a molten glass outlet, and an exhaust gas outlet, the glass melter tank containing a first portion of a glass melt having a melt level rising above the melter tank inlet;
a feeder tank that defines a batch feed inlet and a feeder tank outlet below the melt level, wherein the feeder tank contains a second portion of the glass melt and includes
a feeder bottom wall,
a feeder top wall, and
a feeder sidewall extending upwardly from the feeder bottom wall to the feeder top wall, and wherein each of the feeder bottom wall and the at least one conduit are angled downwardly with respect to horizontal; and
at least one conduit in fluid communication with the feeder tank outlet of the feeder tank and the melter tank inlet of the glass melter tank, and wherein the second portion of the glass melt at least partially fills the at least one conduit and also partially fills the feeder tank.

9. A glass melting furnace, comprising:
a glass melter tank that defines at least one melter tank inlet, a molten glass outlet, and an exhaust gas outlet, the glass melter tank containing a first portion of a glass melt having a melt level rising above the melter tank inlet;
a feeder tank that defines a batch feed inlet and a feeder tank outlet;
at least one conduit in fluid communication with the feeder tank outlet of the feeder tank and the melter tank inlet of the glass melter tank, and wherein a second portion of the glass melt fills the at least one conduit and at least partially fills the feeder tank; and
a heat source in thermal communication with the feeder tank and configured to supply heat to the second portion of the glass melt that extends into the feeder tank in order to maintain the second portion of the glass melt at or above 1100° C.

10. A glass melting furnace, comprising:
a glass melter tank that defines at least one melter tank inlet, a molten glass outlet, and an exhaust gas outlet, the glass melter tank containing a first portion of a glass melt having a melt level rising above the melter tank inlet;
a feeder tank that defines a batch feed inlet and a feeder tank outlet and that includes
a feeder bottom wall, a feeder top wall, and a feeder side wall extending upwardly from the feeder bottom wall to the feeder top wall, wherein the feeder bottom, top, and side walls define a tank chamber, and
a piston configured to move reciprocally between the top feeder wall and the bottom feeder wall of the feeder tank and downwardly within the feeder tank away from the feeder top wall past the batch feed inlet and toward the feeder bottom wall; and
at least one conduit in fluid communication with the feeder tank outlet of the feeder tank and the melter tank inlet of the glass melter tank.

11. The glass melting furnace of claim 10, wherein the piston translates along a piston axis and the at least one conduit extends from an inlet thereof to an outlet thereof along another axis obliquely oriented with respect to the piston axis.

12. A method for introducing batch feed material into a glass melting furnace, comprising:
introducing batch feed material into a feeder tank that is separate from a glass melter tank but fluidly connected to the glass melter tank by at least one conduit;
directing the batch feed material from a feeder tank outlet of the feeder tank, through the conduit, and into the glass melter tank through a melter tank inlet, the melter tank inlet being defined in the glass melter tank below a melt level of a glass melt contained in the glass melter tank and filling the at least one conduit and at least partially filling the feeder tank, wherein the melt level is above the feeder tank outlet; and
melting the batch feed material in the glass melter tank.

13. The method of claim 12, further comprising:
discharging a combustible gas mixture that comprises a fuel and an oxidant directly into the glass melt within the glass melter tank through submerged burners that are immersed by the glass melt.

14. The method of claim 12, further comprising:
moving a piston downwardly within the feeder tank to urge the batch feed material into a portion of the glass melt that at least partially fills the at least one conduit.

15. The method of claim 12, further comprising:
introducing batch feed material directly into the glass melter tank through a batch inlet defined in the glass melter tank above the melt level of the glass melt.

16. A glass melting furnace, comprising:
a glass melter tank that defines at least one melter tank inlet, a molten glass outlet, and an exhaust gas outlet, the glass melter tank containing a first portion of a glass melt having a melt level rising above the melter tank inlet;
a feeder tank that defines at least one batch feed inlet and a feeder tank outlet and that includes
a feeder bottom wall, a feeder top wall, and a feeder side wall extending upwardly from the feeder bottom wall to the feeder top wall, wherein the feeder bottom, top, and side walls define a tank chamber, and
a piston configured to move reciprocally between the top feeder wall and the bottom feeder wall of the feeder tank; and
at least one conduit in fluid communication with the feeder tank outlet of the feeder tank and the melter tank inlet of the glass melter tank,
wherein the at least one batch feed inlet is defined in the feeder side wall.

17. The glass melting furnace of claim 16, wherein the at least one batch feed inlet includes multiple batch feed inlets defined in the feeder side wall.

18. A glass melting furnace, comprising:
a glass melter tank that defines at least one melter tank inlet, a molten glass outlet, and an exhaust gas outlet, the glass melter tank containing a first portion of a glass melt having a melt level rising above the melter tank inlet;
a feeder tank that defines at least one batch feed inlet and a feeder tank outlet and that includes
a feeder bottom wall, a feeder top wall, and a feeder side wall extending upwardly from the feeder bottom wall to the feeder top wall, wherein the feeder bottom, top, and side walls define a tank chamber, and
a piston configured to move reciprocally between the top feeder wall and the bottom feeder wall of the feeder tank; and
at least one conduit in fluid communication with the feeder tank outlet of the feeder tank and the melter tank inlet of the glass melter tank, wherein the feeder tank outlet is above the melt level.

19. A glass melting furnace, comprising:

a glass melter tank that defines first and second melter tank inlets, a molten glass outlet, and an exhaust gas outlet, the glass melter tank containing a first portion of a glass melt having a melt level rising above the first melter tank inlet;

a feeder tank that defines a batch feed inlet and first and second feeder tank outlets; and at least one conduit in fluid communication with at least one of the first feeder tank outlet or the second feeder tank outlet of the feeder tank and at least one of first melter tank inlet or the second melter tank inlet of the glass melter tank, and wherein a second portion of the glass melt at least partially fills the at least one conduit, wherein the at least one conduit includes a first conduit in fluid communication with the first feeder tank outlet of the feeder tank and the first melter tank inlet of the glass melter tank, and a second conduit spaced apart from the first conduit and in fluid communication with the second feeder tank outlet of the feeder tank and the second melter tank inlet of the glass melter tank.

20. The glass melting furnace of claim 19, wherein the first and second conduits are configured such that molten glass circulates between the feeder tank and the glass melter tank by flowing from the glass melter tank into the feeder tank through the second conduit and flowing from the feeder tank back into the glass melter tank through the first conduit.

21. The glass melting furnace of claim 19, wherein the first conduit is angled downwardly from the first feeder tank outlet of the feeder tank to the first melter tank inlet of the glass melter tank, and the second conduit is oriented horizontally between the feeder tank and the glass melter tank.

* * * * *